United States Patent [19]

Krooss

[11] 4,073,376
[45] Feb. 14, 1978

[54] CONVEYOR CLEANING MECHANISM

[76] Inventor: Robert J. Krooss, 74 Ball Road, Mountain Lakes, N.J. 07046

[21] Appl. No.: 770,720

[22] Filed: Feb. 22, 1977

Related U.S. Application Data

[63] Continuation of Ser. No. 573,593, April 30, 1975, abandoned.

[51] Int. Cl.² .................... B65G 45/00; B67C 1/08
[52] U.S. Cl. ...................... 198/498; 198/495; 198/496; 15/97 R; 15/101
[58] Field of Search ............. 198/456, 636, 494–499; 74/230; 15/21 C, 97 R, 256.5, 256.6, 101

[56] References Cited

U.S. PATENT DOCUMENTS

| | | | |
|---|---|---|---|
| 2,787,367 | 4/1957 | Been | 198/494 |
| 3,109,529 | 11/1963 | Carter | 198/456 |
| 3,139,975 | 7/1964 | Schaefer | 198/496 |
| 3,358,813 | 12/1967 | Kohlhagen et al. | 15/97 R |
| 3,510,903 | 5/1970 | Stoever et al. | 15/256.5 |
| 3,896,924 | 7/1975 | Sbarra | 198/494 |
| 3,940,825 | 3/1976 | Murao | 15/97 R |

Primary Examiner—Evon C. Blunk
Assistant Examiner—Joseph E. Valenza
Attorney, Agent, or Firm—Stephen E. Feldman; Marvin Feldman

[57] ABSTRACT

A cleaning mechanism for conveyors and items being transported on conveyors including an endless belt of rug material which contacts the surface of a conveyor or the bottoms of articles being transported thereon to clean them. The mechanism includes a nozzle which is positioned to spray water or water and solvent or solvent onto the endless belt to clean and moisten the belt. A squeegee roller is provided downstream of the nozzle to remove excess liquid so that the desired amount of water remains on the belt. The squeegee roller is spring biased against the belt to remove the excess liquid and also to apply tension to the belt so that the belt is sufficiently taut to perform the cleaning function. The cleaning mechanism can be placed alongside the conveyor to clean the bottom of the articles being transported by the conveyor.

11 Claims, 6 Drawing Figures

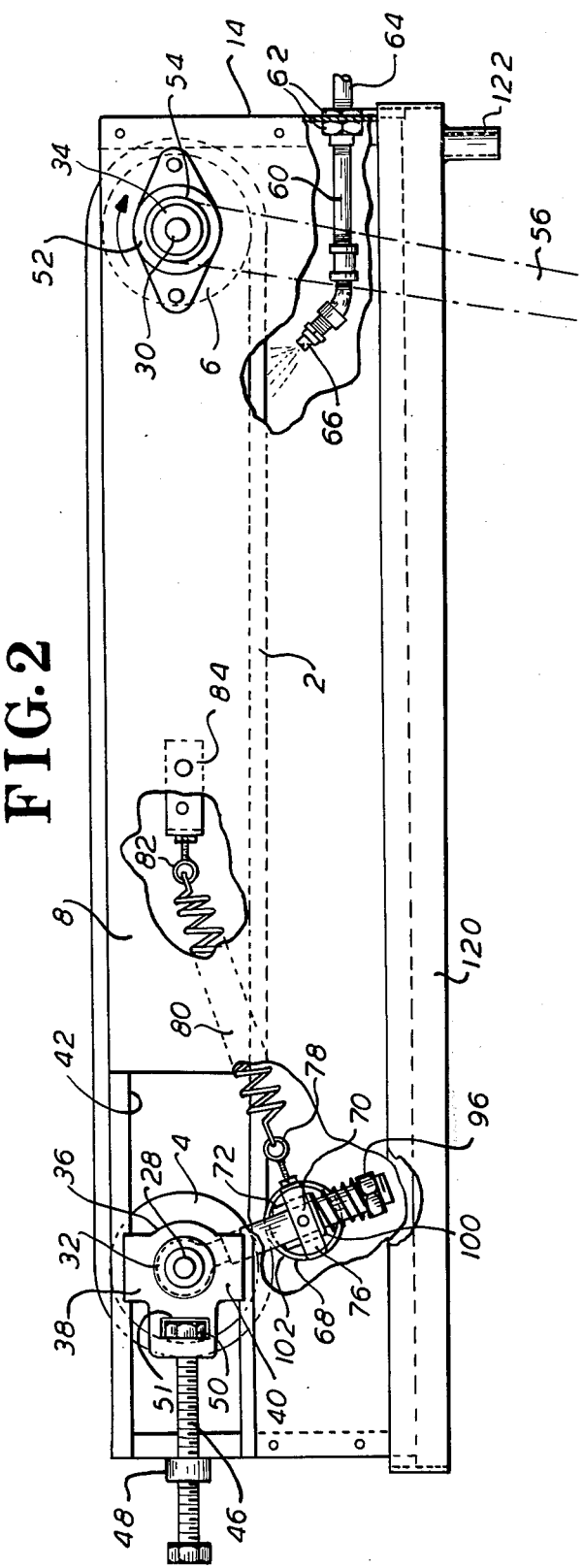
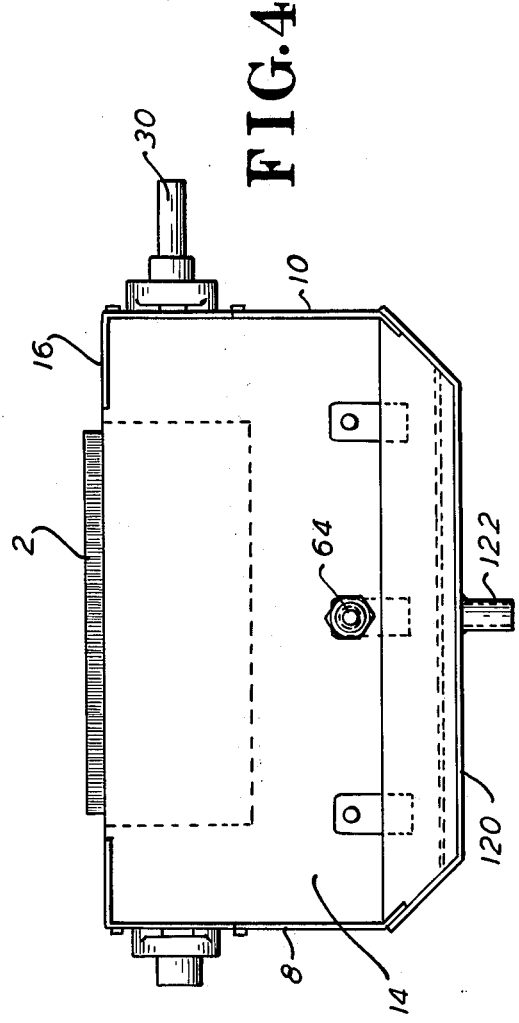

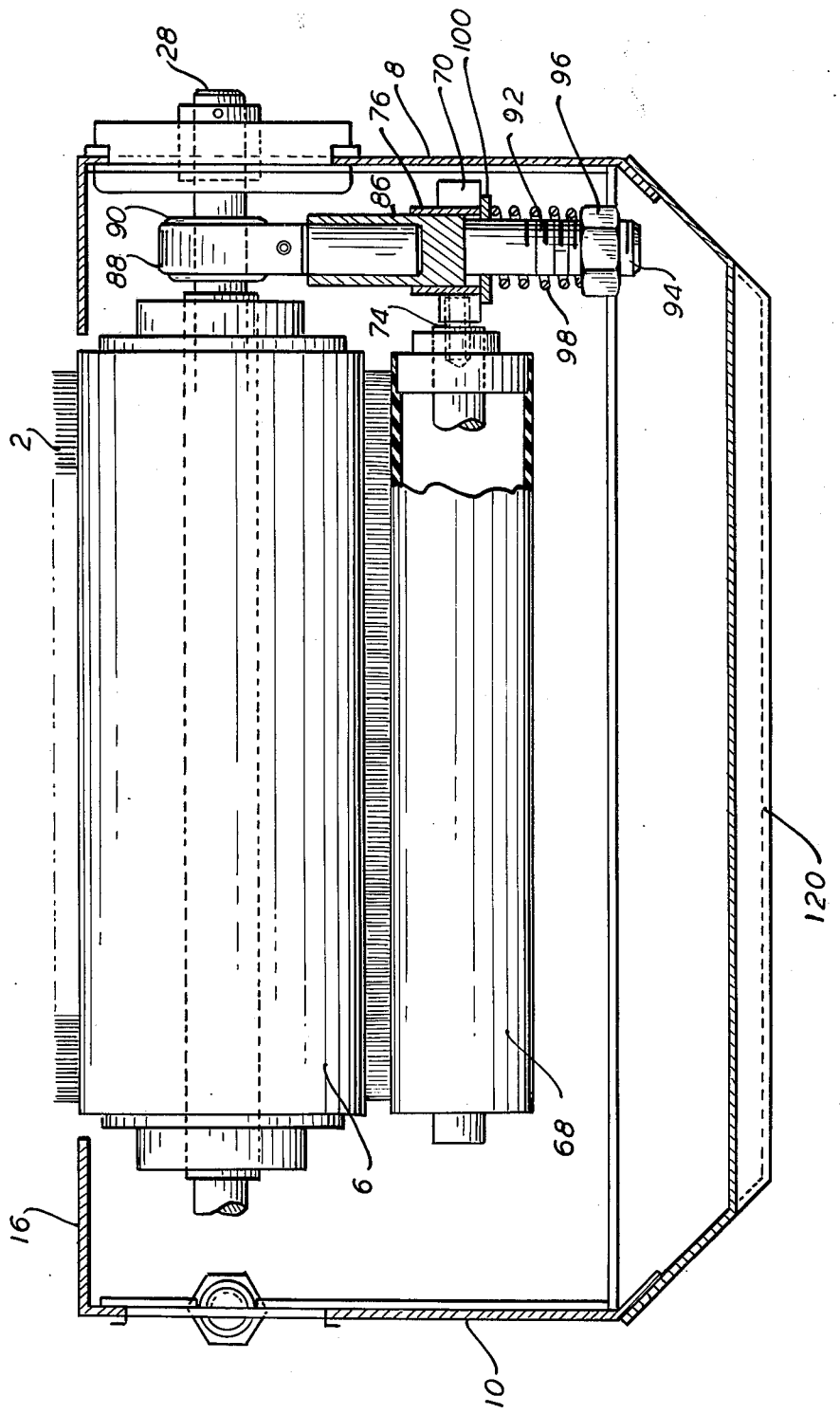

CONVEYOR CLEANING MECHANISM

This is a continuation of application Ser. No. 573,593 filed Apr. 30, 1975 now abandoned.

FIELD OF THE INVENTION

This invention relates to conveyor belt cleaning mechanisms and in particular to cleaning mechanisms which remove spillage from conveyors and/or which clean the underside of articles being transported along a conveyor.

BACKGROUND OF THE INVENTION

In the use of conveyors for transporting bottles and other articles, the substances in the bottles or those about to be placed in the bottles very often spill onto the conveyor in small amounts. These substances adhere to the conveyor and cause dirt and other material to adhere to the conveyor which eventually cause it to jam and manfunction because of the excess amounts of this material. In a similar manner, this spillage adheres to the bottoms of bottles being transported by a conveyor. This will cause the bottles to stick to the conveyor and for dirt and other foreign matter to adhere to the bottoms of the bottles. There have been many attempts to provide efficient cleaning mechanisms for cleaning a conveyor, however, by and large, these mechanisms were unwieldy or unduly complicated. They would apply too much cleaning liquid to the conveyor to aggravate the situation by causing more dirt to adhere to the conveyor, or they would not apply sufficient liquid so that the conveyor would not only be improperly cleaned but would wear more quickly because of this excess contact with the cleaning mechanism.

Thus, there was a desire to provide a cleaning mechanism which would efficiently clean conveyors by applying the proper amount of liquid with the proper amount of rubbing contact to the conveyor in a manner so that the conveyor was sufficiently cleaned. In a similar manner it was desired to provide such a mechanism for cleaning the underside of bottles or other articles that are being transported along the conveyor so that spillage, dirt or other foreign material is removed from them.

SUMMARY OF THE INVENTION

A conveyor cleaning mechanism is provided which includes an endless rug type belt having a plurality of upwardly projecting fibers and including a spraying mechanism which is positioned in contact with the surfaces of the rug belt to apply a fine spray of water or water and a solvent to the belt. The spray is of sufficient fineness to permeate the interstices between the rug fibers so that the belt contains sufficient moisture. The mechanism also includes a spring biased squeegee roller which is biased in two directions to apply sufficient force on the rug belt to control the amount of force applied by the rug belt in cleaning and to act in conjunction with the spray means to clean the belt and control the amount of liquid applied thereto. The biasing of the squeegee roller also maintains the proper tension on the rug belt so that it has sufficient force for the proper cleaning action. A suitable motor is provided to drive the rug belt and drainage means are provided including a drip pan to remove any excess liquid from the mechanism.

An object of this invention is to provide a conveyor cleaning mechanism for removing spillage from conveyors and cleaning conveyors.

Another object of this invention is to provide a mechanism for removing spillage from the underside of the bottles or other articles being transported along a conveyor.

Another object of this invention is to provide a rug belt conveyor cleaning mechanism including a spray and squeegee means for applying a sufficient amount of moisture to properly provide the cleaning function.

Another object of this invention is to provide such a cleaning mechanism which controls the amount of moisture used for cleaning and also the amount of tension applied to the cleaning mechanism.

Another object of this invention is to provide a rug belt conveyor cleaning mechanism which includes a squeegee which is spring biased to control the moisture content of the rug belt and the tension applied thereto.

A further object of this invention is to provide such a cleaning mechanism which employs a spray in combination with the squeegee to clean the rug belt and control the amount of liquid contained in the rug belt.

BRIEF DESCRIPTION OF THE DRAWINGS

FIG. 2 is a side view of FIG. 1, partially cut away.

FIG. 3 is a cross sectional view of FIG. 1 taken alone lines 3—3.

FIG. 4 is an end view of FIG. 1.

PREFERRED EMBODIMENT OF THE INVENTION

Figure 1:
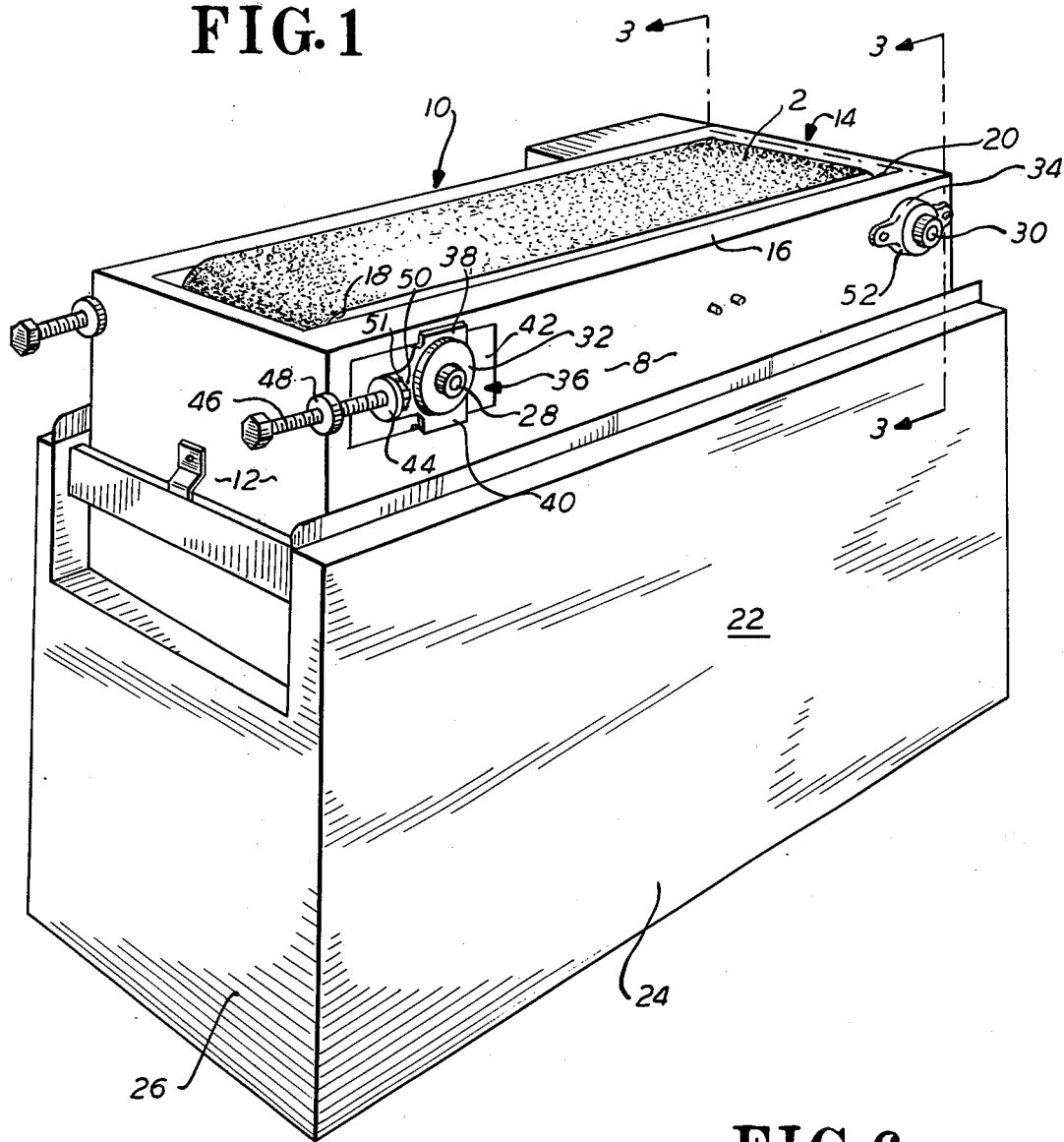
FIG. 1 is an overall view of the cleaning mechanism of this invention.

The construction of this invention, as shown in FIG. 1 includes an endless belt conveyor 2 constructed of rug or carpet material which is positioned around pulleys 4 and 6, 4 being an idler pulley and 6 being a drive pulley. This is more adequately shown in FIG. 2. These pulleys are long horizontal rollers which extend across the width of the mechanism and may be covered with rubber or other suitable material. The endless belt itself consists of an inner layer of conventional cotton conveyor belting covered with a layer of convention high grade industrial carpeting. The conveyor belt is enclosed in a steel cabinet having side walls 8 and 10 and end walls 12 and 14. A suitable top wall 16 is provided below the conveyor belt and with rectangular openings 18 and 20 at each end so that the conveyor belt can pass therethrough. This entire unit may be positioned in a larger cabinet 22. This cabinet has side walls 24 and end walls 26. Suitable rollers or other mechanisms can be provided on the cabinet for transporting the entire mechanism along the floor.

The pulleys 4 and 6 are positioned horizontally and are journalled on shafts 28 and 30. Suitable bearings, such as roller bearings 32 and 34 are provided between the shafts and the pulleys so that the pulleys rotate freely. Shaft 28 which supports idler pulley 4 is supported at each end by movable brackets 36. These brackets are T-shaped in configuration and are supported in slots 42 on walls 8 and 10. They include upper extension 38 and lower extension 40, each of which rest agaist the upper and lower surfaces of this slot 42. An extending section of the bracket 36 includes a circular opening 44 into which bolt 46 is inserted. This bolt is supported by a fixed nut 48 at one end which is welded or otherwise secured to wall 12. At the other end - the bolt fits into a nut 50 which is positioned in opening 51 in brackets 36. The bolt is thus positioned so that turning it in one direction will cause the nut 50 to be screwed into the bolt and thereby cause the bracket to move slightly to the left to apply tension to the rug belt. In a similar manner, turning the bolt in the reverse direction causes the release of tension on the conveyor belt. This adjusting mechanism is for large adjustments in the tension of the belt — fine adjustments are done by the squeegee roller.

The shaft 30 for drive pulley 6 is held securely in support brackets 52 which are bolted or otherwise fastened to side walls 8 and 10. Besides the drive pulley, another short pulley 54 is positioned on shaft 30. A suitable belt, such as a V-belt or a chain is placed around this pulley and connected to a motor (not shown). This provides the drive means for the cleaning mechanism. A typical motor would be a ⅛ H.P. 1725 R.P.M. 110 volt motor. The belt or chain 56 is connected to a pulley which is journalled in the output shaft of the motor.

A spray nozzle 60 is positioned below and to one end of the mechanism. It consists of a pipe (composed of a series of fittings) positioned in a horizontal manner and secured by means of fittings 62, to end wall 14. The other end of the spray nozzle includes an upwardly extending angle coupling which is connected by means of another coupling to a spray head 66. The spray head can be made to be adjustable to emit any size droplet depending on the material being sprayed. Preferably, it is adjustable so that the spray will penetrate into the interstices of the rug belt and penetrate between the fibers so that the entire belt is properly filled with the liquid. If water is used alone, one type of spray will be provided whereas if water and a solvent or a solvent alone were used a different size droplet would be used. The water or solvent is applied to the spray nozzle through a water inlet pipe 64 which is connected to a source of liquid which may include suitable pumping means. Downstream of the spray nozzle (the rug belt rotates in a CW direction, as shown in FIG. 2) the squeegee roller mechanism is positioned. This includes a horizontally positioned roller 68 made of resilient rubber or other suitable resilient material. Preferably, it is a material which will not hold water itself but can apply sufficient force to the rug belt to remove water from it without damaging the belt. It also is preferably of a smaller diameter than pulleys 4 and 6.

The roller is supported on both ends in the same manner, however, for ease in description only one side is shown and described. The roller is journalled in a shaft 70. Suitable bearings such as roller bearings are positioned therebetween for freedom of motion. This shaft is supported on a short shaft 74 which is connected to a U-shaped collar 76. The collar is connected by means of an eyelet 78 to spring 80 which is attached by means of eyelet 82 to a bracket 84 on the side walls 8 and 10 of the mechanism. Collar 76 is positioned around a short vertical cylindrical member 86 which is connected to a circular eyelet member 88. This member 88 is journalled on shaft 28 which supports the idler pulley 4. A rod end bearing 90 is provided between member 88 and shaft 28 to provide ease in rotation. A short shaft 92 is attached to the other end of member 86. This shaft has a screw thread at its outer end 94. A bolt 96 is positioned on this screw thread and a compression spring 98 is positioned between the bolt and a washer 100; the latter being positioned around member 92 and biased against the lower surface of circular coller 76. A suitable bushing 102 is positioned alongside member 86, and resting against the end of the washer. By tightening nut 96 spring 98 is compressed to cause washer 100 to be biased upwardly, which in turn causes collar 76 and thereby the squeegee roller to be biased towards pulley 4. This causes the amount of pressure exerted on the rug belt to be increased. Similarly, by loosening the nut the squeegee is moved away from the pulley. Thus, by adjusting nut 96 the pressure on the rug belt can be increased or decreased.

Spring 80, as aforementioned, acts to hold the squeegee roller against the rug belt at all times. The two springs 80 and 98 act in combination to cause the squeegee roller to apply sufficient pressure to the rug belt so that only the desired amount of water or liquid will remain on the belt.

Thus, after the spray nozzle applies liquid to the belt the squeegee roller, by the use of the two springs exerts the desired amount of pressure against the rug belt so that only the desired amount of liquid is held in the belt. The squeegee roller will remove any excess liquid. The squeegee roller will also tend to remove any undesirable liquids and solids such as materials that have spilled from the bottles onto the belt. This cleaning function is also done in combination with the spray nozzle since the liquid spray not only moistens the belt but cleans it as well. The squeegee roller, also, because of the action of tension spring 80, applies sufficient tension to the rug belt so that it is adequately taut, to accomplish the cleaning function. In other words, spring 80 will cause the squeegee roller to rotate in a CCW direction in FIG. 2 to apply an upward force to the rug belt to increase the tension on the belt. It will be appreciated that tightening bolt 96 causes the squeegee to be moved closer to idler pulley 4, however, at the same time, because of the slidability of collar 76 and the biasing action of spring 80, it causes the squeegee roller to be rotated in a slightly CCW direction so that it increases the tension on the rug belt. It will be noted from FIG. 2 that the rug belt curves slightly upwardly from the horizontal, where it is contacted by the squeegee roller. In a similar manner, loosening nut 96 will cause the squeegee roller to be moved away from idler pulley 4 and at the same time cause spring 80 to rotate the squeegee roller slightly CW to reduce the tension on the rug belt. It will thus be appreciated that the squeegee roller, in combination with its springs, acts as a cleaning mechanism, a tension adjusting mechanism and a liquid control mechanism on the rug belt.

A drip pan 120 is provided underneath the rug belt to catch the excess liquids. A suitable drain 122 may be provided at one end to remove these liquids from the mechanism.

Figure 5:
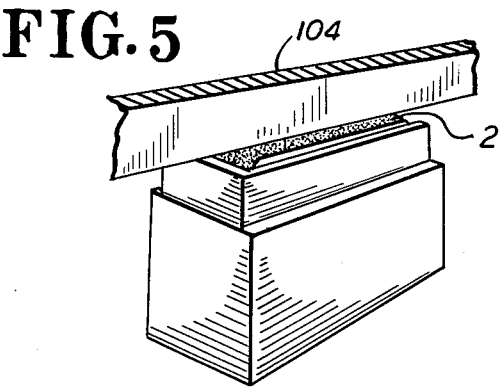
FIG. 5 is a view of the mechanism of FIG. 1 applied as a conveyor cleaner.

FIG. 5 illustrates the device of this invention in position to clean a conveyor. The conveyor can be a link or other type conveyor 104. The cleaning mechanism is positioned so that rug belt 2 is in contact with the underneath surfaces of the conveyor. The spray nozzle and the squeegee roller may be adjusted so that adequate tension and the correct amount of liquid will be applied to properly clean the conveyor.

Figure 6:
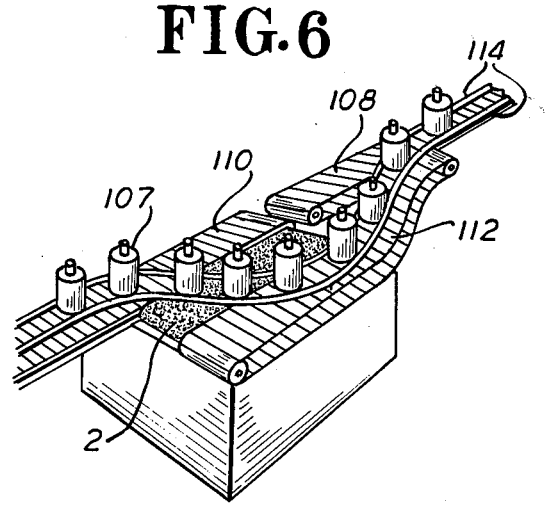
FIG. 6 is a view of the mechanism of FIG. 1 applied to clean the bottoms of articles being conveyed.

FIG. 6 illustrates a mechansim for cleaning the bottom of bottles or other items 107 that are being transported along the conveyor. In this embodiment the mechanism is placed alongside a conveyor. The conveyor also can be a link or othertype conveyor 108. Another conveyor 110 is placed next to the first conveyor. The cleaning mechanism of this invention is placed alongside conveyor 110, belt 2 being place immediately adjacent to the conveyor and at the same horizontal level. Another conveyor, an S-shaped conveyor 112 is placed alongside the rug belt and is suitably driven. Guide rails 114 are then provided in a loop configuration so that the bottles or other items travel along conveyor 108 are then shifted to travel along conveyor 112 and then travel across belt 2 and along conveyor 110. The bottles move in a somewhat perpendicular path across the rug belt 2 (that is at an angle with respect to the direction of travel of the rug belt) to cause a wiping action across the bottoms of the bottles. Thus, even though conveyor 108 may be covered with spilled material and/or dirt, the bottles will arrive at conveyor 110 with their bottoms cleaned. As discussed, previously, the spray nozzle 66 and the squeegee roller are adjusted to obtain the proper tension on the rug belt and the proper amount of liquid in the belt for cleaning of the bottoms of the bottles.

It will be appreciated that a conveyor cleaning and bottle cleaning mechanism has been described which has control mechanisms to provide the proper amount of cleaning pressure and the proper amount of applied cleaning liquid. The mechansim will clean various conveyor mechanisms including belts, links and chains.

It will be further appreciated that while specific embodiments of the invention have been disclosed, the invention is not limited thereto as many modifications thereof may be made by one skilled in the art which falls within the true spirit and scope of the invention.

I claim:

1. A conveyor cleaning mechanism positionable against the underside of a conveyor belt:
   a horizontally movable cleaning belt of carpet like material adapted to remove undesirable material from the conveyor,
   first and second pulleys around which the cleaning belt is positioned,
   cleaning means positioned in contact with the cleaning belt,
   first biasing means for biasing said cleaning means against said cleaning belt to squeeze the cleaning belt between the cleaning means and a pulley to remove undesirable material from the cleaning belt and,
   spray means for applying liquid to the cleaning belt to aid in removing undesirable material from said cleaning belt, said spray means positioned upstream of said cleaning means.

2. The conveyor cleaning mechanism of claim 1 wherein the carpet like material is a carpet.

3. The conveyor cleaning mechanism of claim 1 wherein the cleaning belt is covered with carpet material.

4. The conveyor cleaning mechanism of claim 1 including a second biasing means which biases said cleaning means against said cleaning belt to increase the tension thereon.

5. The conveyor cleaning mechanism of claim 4 wherein said cleaning means is a squeegee roller.

6. The conveyor cleaning mechanism of claim 5 including a first shaft on which said first pulley is positioned and including first means positioned on said shaft, said squeegee roller being movably positioned on said first means under the biasing of said first biasing means, and second means connected to said squeegee roller to connect said second biasing means thereto.

7. The conveyor cleaning mechanism of claim 6 wherein said first biasing means comprises a compression spring and said second biasing means comprises a tension spring.

8. The conveyor cleaning mechanism of claim 7 including an adjustment means positioned on said first means to change the biasing force of said compression spring on said squeegee roller in a path towards said first pulley and wherein a change in said adjustment causes said tension spring to rotate said squeegee roller in a path toward said first pulley to change the tension on said conveyor belt.

9. A cleaning mechanism adapted to be positioned between two substantially parallel conveyors which conveyors have means provided to cause an item travelling on one conveyor to be transported across the cleaning mechanism onto a second conveyor comprising:
   a cleaning belt of carpet like material to remove undesirable material from items travelling on a conveyor,
   first and second pulleys around which the cleaning belt is positioned,
   cleaning means positioned in contact with the cleaning belt,
   first biasing means for biasing said cleaning means against said cleaning belt to squeeze the conveyor belt between the cleaning means and pulley to remove undesirable material from the cleaning belt and,
   spray means for applying liquid to the cleaning belt to aid in removing undesirable material from said conveyor belt, said spray means positioned upstream of said cleaning means.

10. The conveyor cleaning mechanism of claim 9 wherein the carpet like material is a carpet.

11. A conveyor cleaning mechanism comprising:
   a horizontally movable belt having a horizontal upper portion and a horizontal lower portion adaptable to be in contact along a horizontal plane against a conveyor along a major portion of the belt to remove undesirable material from the conveyor,
   first and second pulleys positioned at opposite ends of the first and second portions of the belt and around which the belt is positioned,
   spray means positioned proximate the second pulley and proximate the point of convergence of the conveyor belt to loosen the undesirable material on said conveyor belt,
   cleaning means positioned proximate said first pulley and proximate the point of separation of the conveyor and the belt to aid in removing undesirable material from said belt,
   said cleaning means and said spray means being separated to permit the material wetted and loosened by said spray means to fall from the belt by the force of gravity.

* * * * *